March 31, 1964 W. E. N. DOTY ETAL 3,127,508
METHOD OF DETERMINING TIME-PHASE COINCIDENCE BETWEEN SIGNALS
Filed May 11, 1959 2 Sheets-Sheet 2

INVENTORS
W. E. N. DOTY
M. R. LEE
BY
*Floyd Trimble*
ATTORNEY

United States Patent Office 3,127,508
Patented Mar. 31, 1964

3,127,508
METHOD OF DETERMINING TIME-PHASE
COINCIDENCE BETWEEN SIGNALS
William E. N. Doty and Milford R. Lee, Ponca City,
Okla., assignors to Continental Oil Company, Ponca
City, Okla., a corporation of Delaware
Filed May 11, 1959, Ser. No. 812,289
9 Claims. (Cl. 235—181)

This invention relates generally to improvements in the art of determining the time-phase coincidence between two signals, and is particularly useful in the determination of the various travel times of a signal transmitted through the earth from a first point and received at a second point after propagation over a plurality of paths.

In geophysical prospecting a seismic signal is generated at or near the surface, and the resulting vibrations resulting from its propagation through the sedimentary section of the earth are detected by seismometers or detectors arranged along the surface. The seismic energy travels along a large number of paths from the source to the seismometers. A portion of the energy travels primarily in the shallow portion near the surface in the form of surface and refracted waves. Another substantial portion penetrates to great depths where it encounters surfaces of discontinuity in the elastic characteristics which are closely related to the sedimentary stratification. These surfaces of discontinuity reflect part of the seismic energy which reaches them in its downward propagation, creating reflected waves which travel upward and eventually reach the surface seismometers. The travel times of these reflected waves provide valuable information concerning the sedimentary stratification of the earth.

The transmitted signal may be of two clearly distinct types; either substantially instantaneous with a high peak energy content, as is the case of an explosive blast, or continuous with a long duration of oscillations of relatively small energy content. Our invention is particularly concerned with the use of a signal of the second type. An example of this second type of signal is described in United States Patent No. 2,688,124, issued on August 31, 1954, to Doty et al. and assigned to the assignee of the present invention.

If, in actual practice, an instantaneous signal could be transmitted, the travel times could be readily determined by inspection. Unfortunately, the characteristics of the earth do not permit such a transmission; and experience has shown that a major shortcoming of the explosive technique resides in the lack of control on the shape of the transmitted signal and in the generation of associated noise of high level. On the other hand, it has been found that the generation of a long duration signal of relatively low-energy level provides adequate frequency control and very valuable reduction of the noise.

When a long duration signal is transmitted, the various components of the received signal which correspond to the various paths followed by the seismic energy are not separated in time by the various travel times of these paths, but rather overlap to constitute a very complex received signal. The determination of the travel times therefore becomes equivalent to the determination of the time-phase coincidences between the transmitted signal and each of the components of the complex received signal when these two signals are shifted relatively to each other.

An electronic method for the above-mentioned time-phase determination is described in U.S. Patent No. 2,688,124. It involves multiplication of the signals by each other and integration of the products for each time-phase relation of the two signals, whereby the maxima of the integration values are indicative of time-phase coincidence between the transmitted signal and the various components of the complex received signal. This electronic cross-correlation method generally produces excellent results, but has several shortcomings, in that it requires complex and bulky equipment; it is slow, since an individual integration period is required for each time-phase relation to be investigated and, consequently, it is expensive.

A correlation operation could also be performed by means of an optical computer of the type described in U.S. Patent No. 2,712,415, issued to Piety on July 5, 1955, wherein the two signals are recorded as variable area, light transmission plates; light is transmitted through the two plates divided into two individual beams to independently form the products of the positive and negative portions of the signals, and the two resulting transmitted beams are combined to be detected by a single detector. This optical computer performs exactly the same functions of multiplication and integration which are performed by an electronic correlator. In order to multiply, it requires that two individual light beams be separated and that, for each beam, the plate representing the second signal be spaced from the plate representing the first signal. Such separation is required in order that the plate representing the second signal is illuminated by all the light transmitted through the corresponding portion of the plate representing the first signal, since the multiplication is achieved by the successive reduction of the light content of the beam through its passage across each plate. Consequently, it is also rather complex and bulky.

Broadly stated, the present invention contemplates a novel method of determining the time-phase coincidence of a first and a second signal, which may be defined as the steps of:

(a) Recording each signal as an elongated, constant width track on a transparent recording medium on the same scale, the transversal position of the central portion of each of said tracks being representative of the amplitude of the respective signal, (b) Superpositioning said recording media in contacting relation with coincidence of their respective time scales, (c) Exposing said recording media to a constant intensity light source, (d) Moving at least one of said recording media in a direction to provide relative lengthwise movement between said tracks, and (e) Registering the amount of light passing through said recording media as a function of the time-phase relation between said tracks.

An important object of this invention is to provide a method of determining the time-phase coincidence between two signals, which is efficient and only requires apparatus which is both simple and small.

Another object of this invention is to provide a method of the aforementioned type which does not require a computation of the cross-correlation of the two signals but, nevertheless, provides an equally good indication of time-phase coincidence.

A further object of this invention is to provide a method of the type mentioned in which there is no need for separating the light into two separate beams and for spacing the recording media.

Another object of this invention is to provide a simple and economical method of determining the various travel times of a long duration vibratory signal transmitted through the earth from a first point and received at a second point after propagation over a plurality of paths.

Other objects and advantages of the invention will be evident from the following detailed description when read in conjunction with the accompanying drawings in which.

Figure 1:
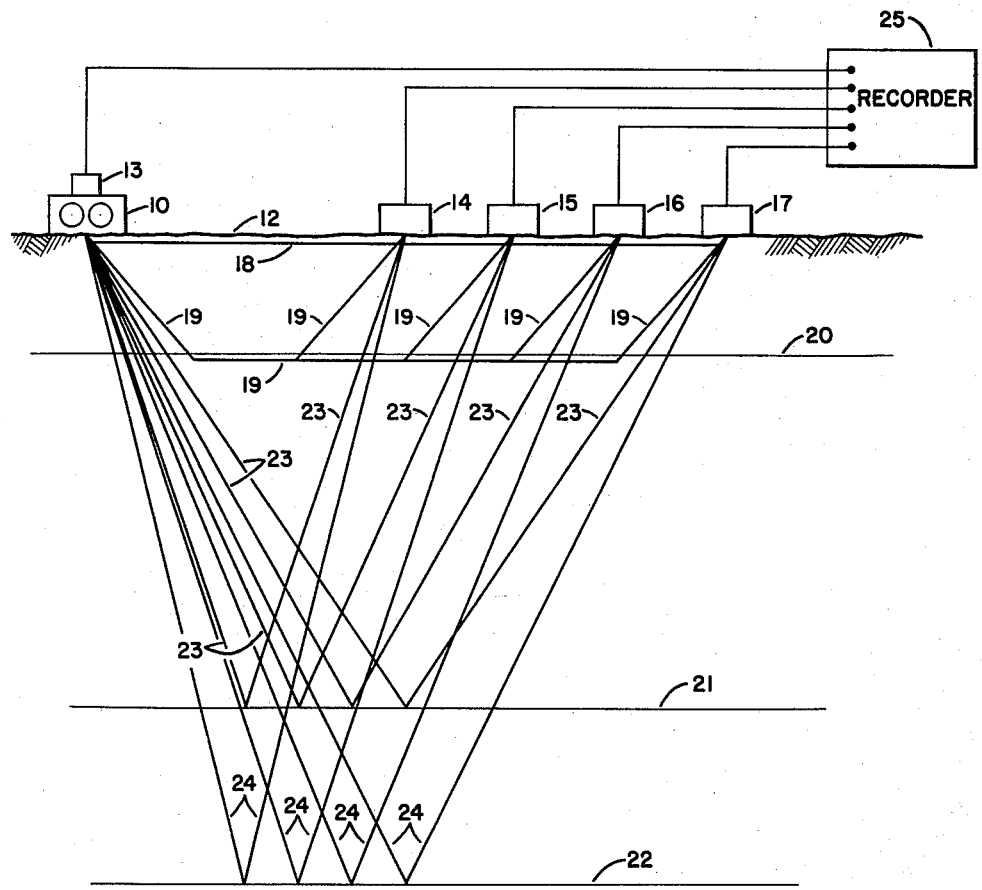
FIGURE 1 is a schematic representation of a field setup which may be used to obtain the records of the transmitted and received signals whose time-phase relations are to be determined.

Referring now to the drawings in detail and to FIGURE 1 in particular, there is shown a seismic exploration field setup wherein a seismic source 10 is placed on the surface 12 of the earth and used to generate seismic waves which are propagated through the earth. The seismic source 10 is preferably a mechanical vibrator having two counter-rotating unbalanced weights so that it generates an oscillating vertical force whose frequency is controlled by the speed of rotation of the weights. In a preferred embodiment of this invention, the vibrator 10 is operated from a low frequency up to a higher frequency and then back to a lower frequency in a cyclic fashion for purposes hereinafter set forth. Transmission of a complete range of such frequencies is referred to as a sweep, and it is usually desirable to transmit several sweeps at each transmitting point. The seismic signal generated by the vibrator 10 is duplicated as an electrical signal such as may be produced by a seismometer 13 placed on the vibrator.

A series of seismometers 14, 15, 16, and 17 are arranged in a predetermined geometric array to detect the seismic waves which propagate from the vibrator 10 along the various indicated paths. In particular, a portion of the seismic energy reaches the seismometers 14–17 along a path 18 coinciding with the surface 12 of the earth. This energy constitutes the surface wave. Another portion of the seismic energy usually penetrates the earth a rather short distance, as indicated by path 19, where it reaches a refracting high velocity formation, indicated by line 20. This last-mentioned energy portion travels horizontally along the refractor 20 before re-entering the shallow layers to reach the seismometers 14–17 at the surface. The energy portion following this path 19 constitutes the refracted wave. Still other portions of the seismic energy penetrate more deeply into the earth and are partially reflected by interfaces, such as at 21 and 22 where abrupt changes in the physical characteristics of the propagating material occur. These interfaces are commonly called reflectors and the energy portions which travel along the paths indicated at 23 and 24 constitute the reflected waves.

The signals detected by the seismometers 14, 15, 16, and 17 are the result of the superposition of all the individual waves (surface, refracted, and reflected) reaching each of the seismometers. Obviously, the individual components of this complex received signal have the frequency characteristics of the transmitted signal, and their time-phase is indicative of the travel times associated with their particular paths.

The electrical signals produced by the seismometers 13, 14, 15, 16, and 17 are recorded simultaneously, but individually, as tracks on a convenient recording medium. The individual signals are preferably recorded in the field by a magnetic recorder (not shown), so that they may be reproduced at a later time for further analysis. Alternatively, these individual signals may be recorded directly in the field by a recorder 25 in the form of individual elongated optical constant width tracks on a transparent recording medium, the transversal position of the central portion of each track being representative of the amplitude of the respective signal. Recorder 25 may be of the type described in connection with FIGURES 2 and 3 of the above-mentioned U.S. Patent No. 2,712,415, issued to R. Piety. If the signals are magnetically recorded in the field, they are later reproduced and re-recorded in the optical recorder 25, so that, in any case, the original signals are transcribed on the same time scale as optical tracks of the type described.

It will be understood that the recorder 25 produces a record having a series of parallel tracks thereon, with each track representing the signal produced by one of the seismometers 13–17. In the embodiment illustrated, the various tracks produced by the recorder 25 are recorded as the respective signals are produced by the respective seismometers; therefore, the relative lengthwise positions of the information in such tracks are indicative of the time delays between transmission of the vibratory signal by the vibrator 10 and the reception of the signal at the various seismometer locations. It should be understood, however, that the signal produced by the seismometer 13 may be passed through a suitable device (not shown) such as a magnetic recorder and reproducer and delayed a known length of time before being recorded by the recorder 25. In either event, the signal produced by the seismometer 13 is also recorded a plurality of times on a separate multi-channel record to provide a track representative of the transmitted signal for use with each of the tracks provided by the recorder 25 in the field, as will hereinafter appear.

Figure 2:
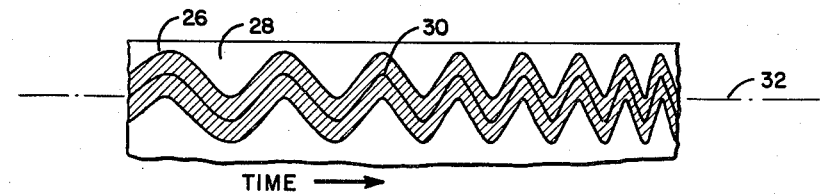
FIGURE 2 is an illustration of a record representing the transmitted signal.

The variable frequency signal representative of the seismic waves transmitted by the vibrator 10 is indicated in FIGURE 2. It may be seen that this signal forms an elongated optical track 26 of constant width which may be either opaque or transparent, depending on the choice of the preferred type of operation. The track 26 is recorded on a suitable transparent recording medium 28 a plurality of times, as well as on the same record with the received signals, as indicated. The central portion 30 of the elongated track 26 is displaced transversally by an amount indicative of the amplitude of the recorded signal. The width of the track 26 is preferably taken substantially equal to half of the maximum distance between its extreme excursions. Stated otherwise, the track width is approximately equal to the range of the variations of the recorded signal. Thus, the lateral boundaries of the track 26 do not cross the center line 32 of the track.

Figure 3:
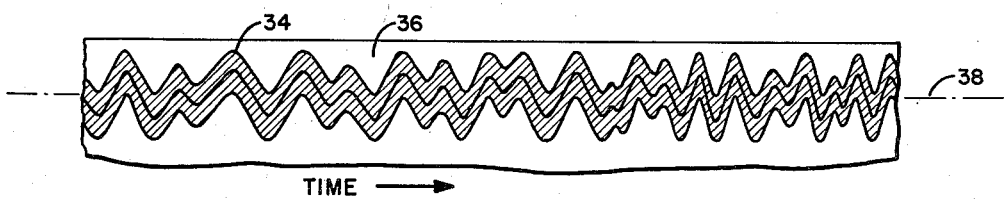
FIGURE 3 is a similar illustration of a record representing one of the received signals.

The optical track 34 shown in FIGURE 3 is representative of the complex signal produced by any one of the seismometers 14, 15, 16, or 17. The track 34 is recorded on a recording medium 36 in the same manner as the track 26 and has a constant width equal to half of its extremal excursions, such that the lateral boundaries of the track 34 do not cross the center line 38 thereof. The time scale of track 34 is the same as that of the track 26.

In practice, as previously indicated, the tracks representing the transmitted and the received signals are recorded simultaneously and in side-by-side relation on a common recording medium 36; and a separate record 28 containing a plurality of tracks 26 is also made. Thus, the track 26 on such common recording medium representing the transmitted signal may be used as a reference for the determination of the time shift necessary to obtain phase coincidence between the transmitted signal and the various components of the received signal.

Figure 4:
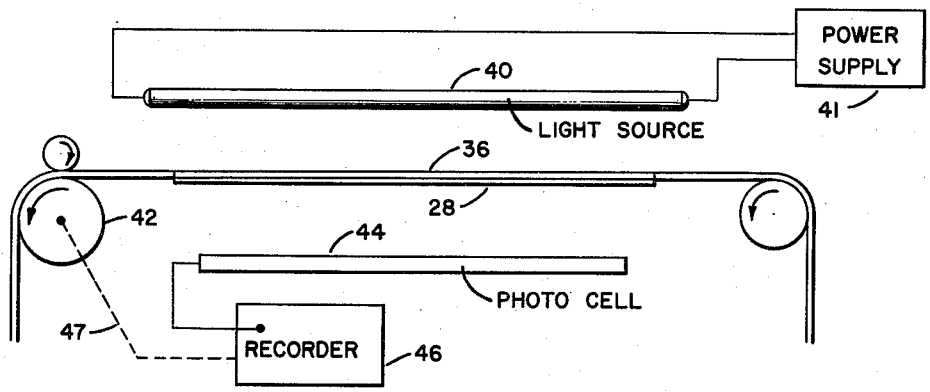
FIGURE 4 is a diagrammatic representation of a device which may be used while practicing this invention to determine the time-phase coincidences between a transmitted signal and each of the components of a received signal.

Referring now to FIGURE 4, there is schematically illustrated a device which may be used in the method of the present invention to determine the time-phase coincidence of two signals represented by one track 26 and one track 34. An elongated light source 40, such as an ordinary fluorescent tube, is energized by a power supply 41. This power supply furnishes the necessary constant voltage to insure that light source 40 radiates a constant amount of energy. For example, a 300-volt D.C. supply has been found very adequate to energize two ordinary fluorescent tubes connected in series and end-to-end to form a light source of the desired length.

The light produced by source 40 uniformly illuminates an area in which the two optical recordings 28 and 36 as illustrated in FIGURES 2 and 3 are superpositioned in contacting relation. The center lines 32 and 38 of the two optical tracks 26 and 34 are made to coincide. One of the records in FIGURE 4 (such as record 36) is movable lengthwise under the control of the rotation of a roller 42. The other record 28 is held fixed in a flat position, immediately above or below record 36. In a preferred embodiment, the movable record is the one representative of the received signal, while the fixed record beholds the transmitted signal. However, only the relative lengthwise movement of these two records is important from the point of view of establishing the time shift between the recorded signals 26 and 34 and, consequently, the record 28 representing the transmitted signal could be displaced while the record 36 representing the received signal is held motionless.

The amount of light allowed to pass through the two superpositioned optical tracks 26 and 34 is tested by an elongated light sensitive detector, such as photocell 44. The variations of the amount of light transmitted through the two records as a function of their relative lengthwise displacement are obtained by recording the variations of the output of the light detector 44 by a recorder 46, which may be an ordinary oscillograph recorder. The movement of the roller 42 controlling the relative displacement of the two optical tracks, and the movement of the recording medium of recorder 46 are synchronized, as diagrammatically indicated by line 47.

It is clear that the amount of light transmitted through the two optical tracks 26 and 34 is indicative of the coherency between the two signals. In fact, if we call $f(t)$ and $g(t)$ the two recorded signals, the variations $h(\tau)$ in the amount of light transmitted through the optical tracks, when they are relatively shifted by a time interval $\tau$ if:

$$h(\tau) = \int_0^T [f(t) - g(t-\tau)] dt$$

where T is the total time interval during which the transmitted signal is used as a reference.

Obviously, this scheme is quite different from the aforementioned cross-correlation scheme, in which the cross-correlation $\phi(\tau)$ of two signals $f(t)$ and $g(t)$ is defined as:

$$\phi(\tau) = \int_0^T f(t) g(t-\tau) dt$$

The multiplication of two signals, as required for correlation, calls for great complexity. However, we have found that, for the determination of time-phase relationship between long duration signals, the present method provides practically identical results, with greater simplicity and flexibility, as will hereinafter appear.

It should also be noted that, in use of the present method in seismic exploration to determine the travel times of a variable frequency long duration signal, the span of the light beam produced by the source 40 (measured along the lengths of the tracks 26 and 34) should be at least as great as any portion of the track 26 which includes the lowest and highest frequencies transmitted. For example, when a sweep-type signal is transmitted, the light beam should scan at least one sweep of the transmitted signal at each instant to assure that a complete range of frequencies are represented in the output of the respective detector 44.

A striking example of the flexibility of the present method is that of the possibility of obtaining a filtering effect useful in controlling the shape of the resulting indication of time-phase coincidence by merely controlling either the relative intensity of the light 40, or the sensitivity of its detection in the different frequency portions of the transmitted signal 26. For example, the single elongated photocell 44 of each channel of the device shown in FIGURE 4 may be replaced by several adjacent shorter units (not shown) with independently controllable output. Each individual photocell is then primarily indicative of time-phase coincidence within the frequency band of the transmitted signal 26 which overlies it; and by adjusting the sensitivity of the various photocells, a filtering effect can be achieved which can be used to improve the frequency spectrum of the final elementary events. For example, if the events 52, etc., on record 48 are too broad, indicating an excess of low frequency content, the higher frequency portion of the transmitted signal may be magnified by increasing the intensity of the respective photocell to sharpen the events.

Figure 5:
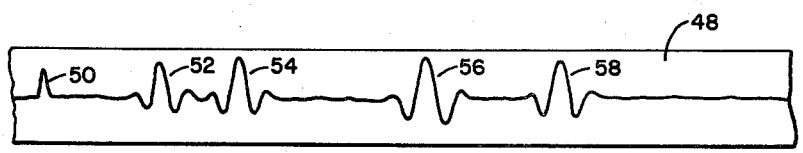
FIGURE 5 is an illustration of the results obtained by use of the present invention.

FIGURE 5 illustrates a record 48 produced by recorder 46 of FIGURE 4. It is illustrative of the various events which appear on such a record, when a signal having characteristics of the type indicated in FIGURE 2 is transmitted in the conditions shown in FIGURE 1. For simplicity, we have indicated only one channel in the previous description of FIGURE 4, although, in actual practice, as previously set forth, a record 36 made by recorder 25 has as many channels as there are detector stations on the ground, with in addition, the channel indicative of the transmitted signal. The record 28 is then made with an equal number of channels; however, all these channels comprise the same optical track 26 which is that representative of the transmitted signal. In this actual practice, it will be understood that a separate detector 44 must be provided for each pair of superpositioned tracks in the records 28 and 36, although we have found that a single light source 40 may be used, and the recorder 46 may be multi-channel to separately record the outputs of the various detectors 44.

When the two recording media 28 and 36 are relatively shifted in contacting relationship, the output of the channel corresponding to superpositioning of two of the tracks 26 which represents the transmitted signal serves to produce a signal indicated at 50 in FIGURE 5 which indicates the reference time of generation of the transmitted signal. This signal is marked on all the other channels and may be used to start a timing line generator. Thereafter, in each channel, signals indicative of time-phase coincidence between the fixed transmitted signal and a component of the shifting received signal appear on the record 48. For example, shortly after the reference time 50, there appears an event 52 indicative of the arrival of the surface wave, and afterwards an event 54 indicative of the arrival of a refracted wave. At later times, events 56 and 58 are indicative of the arrivals of reflected waves.

From the foregoing, it will be apparent that the present invention provides a novel method in determining the time-phase coincidence between two signals which is simple and efficient and requires only apparatus which is both simple and small. The present method does not require cross-correlation of the two signals and therefore does not require a separation of a light beam, yet provides an equally good indication of time-phase coincidence. It will be further apparent that the present invention provides a novel method of determining the travel times of a seismic signal propagated through the earth over a plurality of paths.

Changes may be made in the combination and arrangement of the steps and procedures heretofore set forth in the specification and shown in the drawings without departing from the spirit and scope of the invention as defined in the following claims.

We claim:
1. A method of determining the time-phase coincidence of a first signal and second signal, which comprises the steps of:
   (a) recording each signal as an elongated constant width track on a transparent recording medium on the same time scale, the transversal position of the central portion of each of said tracks being representative of the amplitude of the respective signal,
   (b) superpositioning said recording media in contact- ing relation with coincidence of their respective time scales, (c) simultaneously exposing the entire length of one of said recording media to a constant intensity light source, (d) moving the remaining recording media in a direction to provide relative lengthwise movement between said tracks, and (e) registering the amount of light passing through said recording media as a function of the time-phase relation between said tracks.

2. A method as defined in claim 1 wherein one of said recording media is held in a fixed position adjacent the light source in a position to intercept the beam of light emitted by the light source, and the other recording media is moved in a direction to progressively move the respective track lengthwise through the light beam.

3. A method as defined in claim 1 wherein the length of each of said tracks intercepting the light beam at any instant includes a plurality of cycles of the respective signal being represented.

4. A method as defined in claim 1 wherein said registering includes increasing the effect, on the total light registration, of the amount of light passing through various portions of the recording media with respect to the amount of light passing through other portions of the recording media to magnify the effect provided by correspondence of selected portions of the track.

5. A method of determining the travel times of a variable frequency vibratory signal transmitted through the earth from a first point along various paths to a remote second point, which comprises the steps of:

(a) recording a replica of the signal transmitted at the first point as an elongated constant width track on a first transparent recording medium, the transversal position of the central portion of said track being representative of the amplitude of the respective signal, (b) recording the signal received at the second point as an elongated contant width track in a second transparent recording medium with the same time scale as the track representing the signal transmitted at the first point, the transversal position of the central portion of the track on said second recording medium being representative of the amplitude of the respective signal, (c) superpositioning said recording media in contacting relation with coincidence of their respective time scales and with the relative lengthwise positions of said tracks arranged in a known relation with respect to the times of transmission of the signal at the first point and reception at the second point, (d) positioning a light source to direct a beam of light through substantially all of said first transparent recording medium and then through the second transparent recording medium, (e) moving said second transparent recording medium in a direction to provide relative lengthwise movement between said tracks, and (f) registering the amount of light passing through the recording media as a function of the relative position of said tracks, whereby the occurrences of maximum light passage through the recording media are indicative of the travel times of the vibratory signal along the various paths.

6. A method as defined in claim 5 wherein the first recording medium is held in a fixed position and the second recording medium is moved to provide relative lengthwise movement between said tracks.

7. A method as defined in claim 5 wherein the span of the light beam measured along the length of said tracks is at least as great as any portion of the track on the first recording medium which includes the highest and lowest frequency content of the signal transmitted at the first point.

8. A method as defined in claim 5 wherein the vibratory signal is transmitted in sweeps, each of which sweeps include a range of vibrations from the lowest to the highest frequencies of the vibratory signal, and wherein the light beam is of a span measured along the lengths of the tracks to simultaneously scan a length of the track on the first recording medium representing at least one sweep of the vibratory signal transmitted from the first point.

9. A method as defined in claim 6 wherein the amount of light passing through various portions of the first recording medium is intensified with respect to the amount of light passing through other portions of the first recording medium to magnify the effect provided by correspondence of selected frequencies in the tracks.

References Cited in the file of this patent

UNITED STATES PATENTS

| | | |
|---|---|---|
| 2,688,124 | Doty | Aug. 31, 1954 |
| 2,712,415 | Piety | July 5, 1955 |
| 2,839,149 | Piety | June 17, 1958 |